Aug. 12, 1952     H. ALLEN     2,606,740
VALVE
Filed April 5, 1945     4 Sheets-Sheet 1
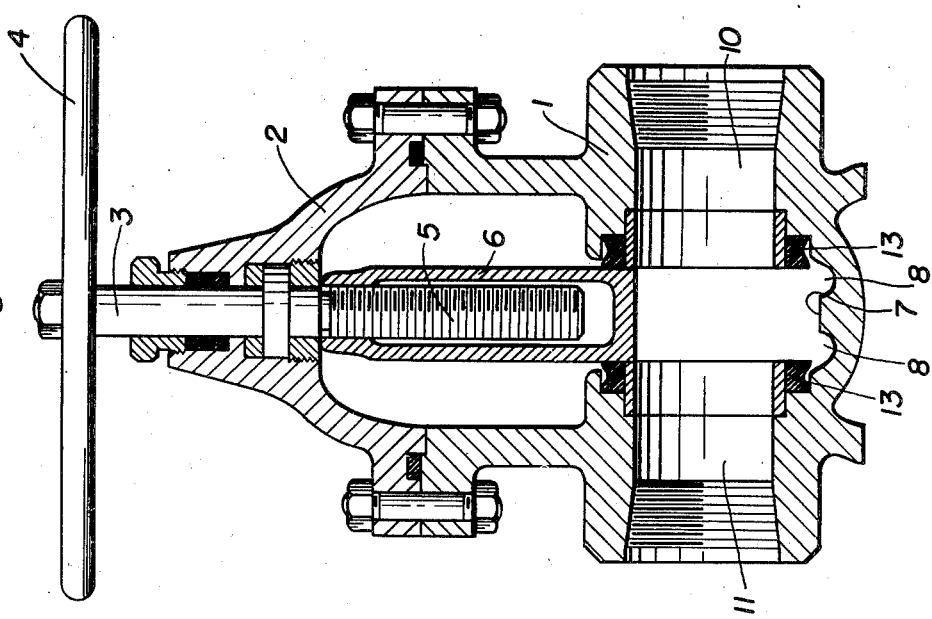
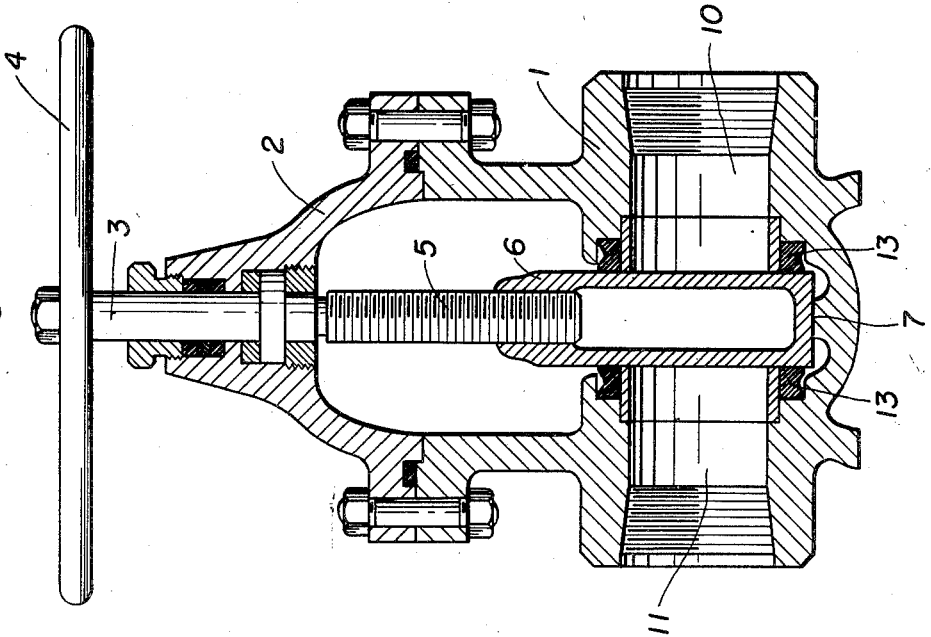
HERBERT ALLEN INVENTOR Aug. 12, 1952  H. ALLEN  2,606,740
VALVE
Filed April 5, 1945  4 Sheets-Sheet 2
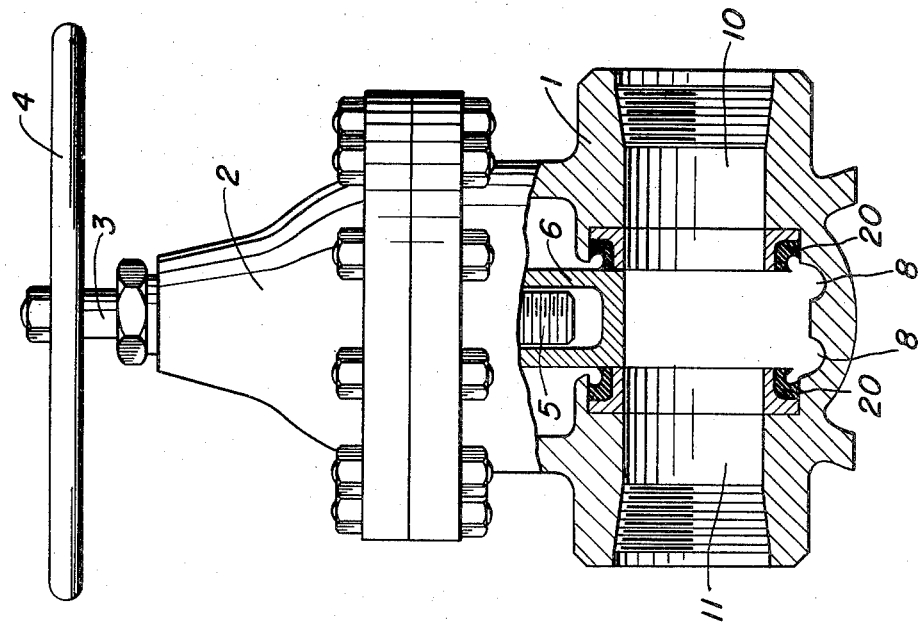
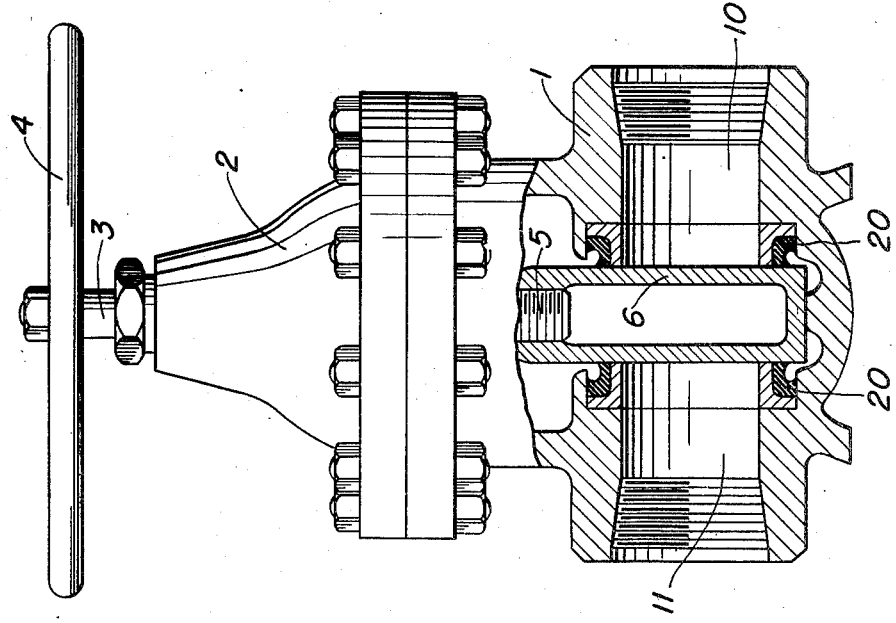
HERBERT ALLEN INVENTOR
BY J. Vincent Martin
Ralph R. Browning
Attorneys Aug. 12, 1952   H. ALLEN   2,606,740
VALVE Filed April 5, 1945   4 Sheets-Sheet 3

HERBERT ALLEN INVENTOR

Aug. 12, 1952  H. ALLEN  2,606,740
VALVE
Filed April 5, 1945  4 Sheets-Sheet 4
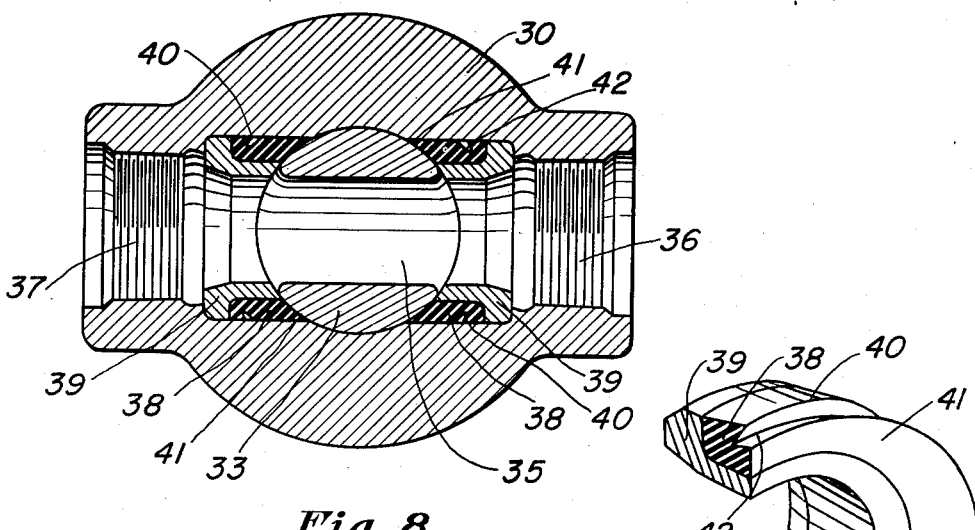
Fig. 8
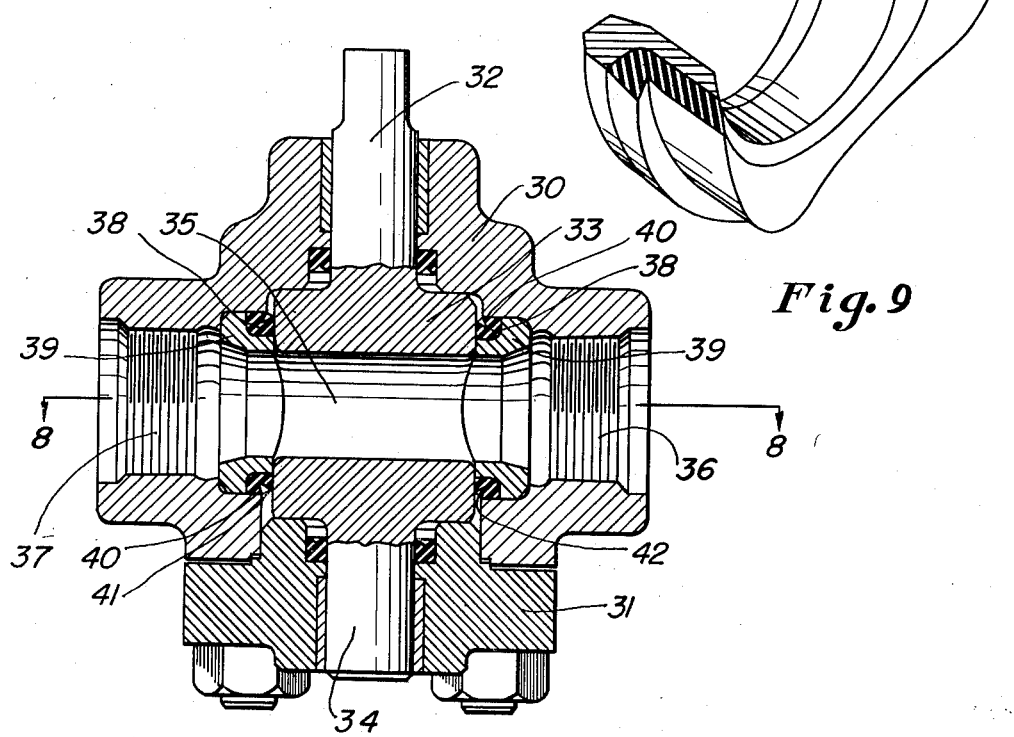
Fig. 9
Fig. 7
HERBERT ALLEN  INVENTOR
BY
Attorneys Patented Aug. 12, 1952

2,606,740

UNITED STATES PATENT OFFICE 2,606,740

VALVE

Herbert Allen, Houston, Tex., assignor to Cameron Iron Works, Houston, Tex., a corporation of Texas Application April 5, 1945, Serial No. 586,657

5 Claims. (Cl. 251—167)

This invention relates to valves and more particularly to the form of sealing means adapted to seal against the closure member of the valve when the latter is closed.

The invention in one of its more specific aspects relates to a valve structure provided with a reciprocating, screw actuated gate valve of the nonrising stem type, in which the gate valve is provided with a special form of sealing ring or packing member, adapted to seal against the gate.

The invention in another of its specific aspects relates to a valve structure having a rotating plug and being provided with a special form of sealing ring or packing member, adapted to seal against the plug.

The invention has as its principal object the provision of a valve having a fluid pressure actuated sealing means which will not tend to tear off or be blown past the valve closure member while the gate is being opened or closed.

Another object is to provide the sealing means with a lip which as the valve begins to open will first be uncovered to the high pressure fluid so as to equalize the fluid pressure acting on the two sides of the sealing lip.

Another object is to provide the sealing means with a lip which will not tend to be blown past the valve closure member as it cracks open in opening the valve.

Other objects will become apparent as the description proceeds.

Referring to the accompanying drawings, Figures 1 and 2 illustrate one form of the invention as embodied in a gate valve structure showing the valve in closed and open positions respectively.

Figures 3 and 4 illustrate a modified form of the invention also embodied in a gate valve structure and likewise show the valve in closed and open positions respectively.

Figure 5, partially in section, shows the sealing ring employed in the valve structure of Figures 1 and 2.

Figure 6 partially in section shows the sealing ring employed in the valve structure of Figures 3 and 4.

Figure 7 illustrates a cross section of the invention embodied in a plug type valve structure taken along the axis of the flow passage therethrough and along the axis of the plug, showing the plug in open position.

Figure 8 is a section taken through the valve structure of Figure 7, but in a plane transverse to the axis of the plug, and Figure 9, partially in section and partly in perspective, shows the sealing ring employed in the structure of Figures 7 and 8.

Figure 5:
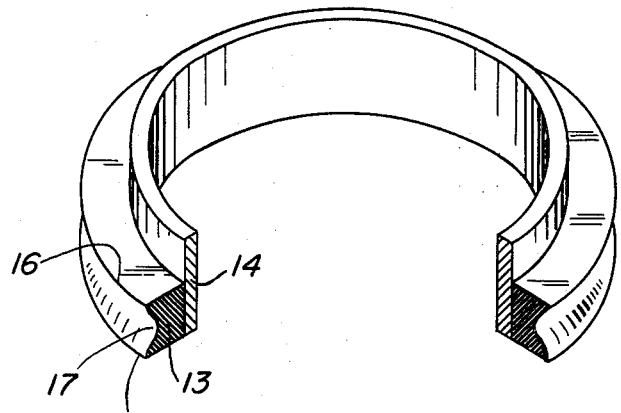

Referring to Figures 1 and 2, all parts of which are not identified since the parts are common and well known in the art, 1 designates the valve housing to which is securely fastened the bonnet 2. A nonrising stem 3 passes through the bonnet into which it is securely packed by suitable packing and is adapted to be actuated by a handwheel 4. The downwardly depending portion of the stem is screw threaded at 5 and is inserted into a gate element 6 in which mating screw threads are provided so that the gate valve may be screw actuated in a reciprocating manner.

Directly beneath the gate valve and forming a part of the housing 1 there is provided a stop or abutment 7 against which the gate valve rests when in its closed position. On each side of this abutment is a gutter or depression 8, which communicates with the valve closure chamber within which the gate or other closure operates.

Either side of the structure shown may be the upstream side, but for the sake of convenience the side which is designated as 10 will be referred to as the upstream side, and the side designated 11 as the downstream side. In those portions of the housing 1 adjacent to the gate there are provided suitable counterbores or recesses, as shown, into which there are inserted sealing rings 13, one form being shown more clearly in Figure 5, and a modified form 20 being shown more clearly in Figure 6.

In the form of sealing ring shown in Figure 5 and which is employed in the structure of Figures 1 and 2, the sealing ring comprises a rubber or other flexible material portion 13 suitably bonded to a metallic backing 14. The portion 13 is provided with two lips 15 and 16 with a groove 17 therebetween, forming, when viewed in cross-section, a section which closely resembles that portion of a pulley in which the rope travels. The lips, in respect to the portion 13 are radially outwardly presented.

As stated, let it be assumed that the fluid pressure is coming from the right-hand side of the valve. With the gate 6 closed as in Figure 1, the fluid pressure will leak past the right-hand sealing ring 13 and fill the space within which the gate operates so that this space will be under the same fluid pressure as that prevailing on the high pressure side of the valve. This fluid pressure will act between the outwardly presented lips 15 and 16 of the left-hand sealing ring, tending to force these lips against the valve housing and against the gate respectively so as to seal the gate shut.

Now, when the gate begins to move upwardly, when the nonrising stem is actuated, toward open position, it will first expose to the fluid pressure within the valve housing the extreme lower lip of that portion of the left-hand sealing ring which is in engagement with the gate. The fluid pressure within the valve housing will then be allowed to act upon an ever increasing amount of the face of that lip which engages the gate when the gate is closed. With fluid pressure on both sides of this sealing lip there is no tendency for the lip to follow the gate as it moves toward open position and hence there is no tendency for the fluid pressure from the upstream side of the valve to blow the sealing ring past the gate.

When the gate reaches its full open position, Figure 2, it is still in engagement with the upper portion of both sealing rings so that it may move back towards its closed position, Figure 1, without having to have its leading edge pass over the upper portions of the sealing lips on the packing rings. When the gate nears its closed position, flow will continue to take place until the gate is fully closed, whereupon the pressure within the valve housing will again force the lips 15 and 16 of the sealing ring on the downstream side of the gate into sealing engagement both with the gate and with the valve housing.

Figure 6:
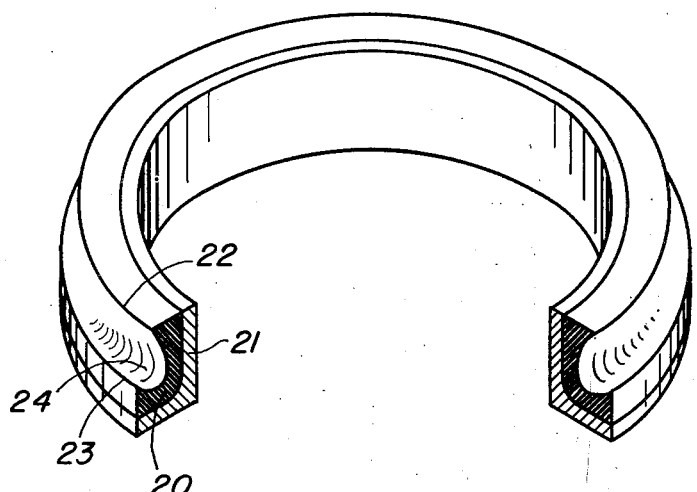

The operation of the valve structure shown in Figures 3 and 4 is substantially the same as that just described. However, the sealing ring structure employed in this modification has been slightly changed. As shown in Figure 6 the sealing ring comprises a rubber or other flexible material portion 20 suitably bonded to a metallic backing 21, shaped as shown. The portion 20 is provided with two lips 22 and 23 with a gutter portion 24 therebetween, said lips being shaped as shown.

Referring to Figures 7 and 8, 30 designates the valve housing to which is securely fastened the cover 31. A stem 32 providing one bearing for the plug passes through the valve housing and forms a part of the rotary plug 33, which is the valve closure member. The stem is rotatably sealed to the housing by the suitable packing material and the rotary plug is thus mounted for rotation in the chamber provided therefor. A second bearing member 34, carried by the other end of the plug is also rotatably sealed into the base portion 31 by suitable packing material. The rotary plug 33 is provided with a transverse bore 35, which when the rotary plug is in open position communicates with one end of the flow passage through the valve structure at 36 and with the other end of the flow passage through the valve structure at 37. In those portions of the housing 30 adjacent to the plug, as shown, there are provided suitable counterbores or recesses, into which there are inserted removable sealing rings 38, such sealing ring being more clearly shown in Figure 9.

In the form of sealing ring shown in Figure 9, the ring comprises a rubber or other flexible material portion 38 suitably bonded to a metallic backing 39. The portion 38 is provided with two lips 40 and 41 with a gutter portion 42 between said lips, forming, when viewed in cross-section a V-shaped gutter. The lips, in respect to the portion 38 are outwardly presented.

While the valve is capable of use with either end as the inlet, let it be assumed that the fluid pressure is coming from the right-hand side of the valve as shown in Figures 7 and 8. With the plug 33 closed, fluid pressure from the upstream side of the valve structure leaks past the sealing ring at the upstream side 36 of the valve and spreads the lips of the sealing ring on the downstream side 37 of the valve to force the lips into sealing engagement both with the body of the valve housing and with the rotary plug valve. This sealing material being flexible will form a seal even though grit or the like may be between the sealing ring and the surface against which it seats, and the presence of the grit will not harm the sealing ring.

The sealing ring is not made so that the edge of the lip which engages the rotary plug will have any natural tendency to press against the plug. The sealing engagement between this lip and the plug is effected entirely by fluid pressure, and when this pressure is relieved, as when the plug valve is partly open, the lip will not tightly engage the plug and the plug may be rotated without any tendency to drag the edges of the lips of the respective sealing rings into the axial bore through the plug.

It will be seen that as the plug valve moves from the open position shown in Figure 8, towards closed position, there is no edge portion of the transverse bore through the plug which is required to approach the edge portion of a sealing ring in such a manner as would tend to drag it along with the plug and cut off the edge portion of the sealing ring.

When the plug valve moves toward open position, the edge of the sealing ring which is holding pressure will first be exposed to the interior of the transverse bore through the plug, but said interior will contain the same pressure as that to which the outer surface of the sealing ring has been subjected, so consequently there will be no tendency for the sealing ring to blow in to the transverse bore through the plug, and as the plug is rotated, the edges of the transverse bore therethrough may pass without tearing or cutting the edge of the sealing ring.

It is clear from this description that one of the principal results accomplished by the invention is to provide a valve with a sealing means which will be forced into sealing engagement both with the valve housing and with the valve closure member by the pressure from the upstream side of the valve, but which will not tend to be torn off or be blown past the closure while the same is being opened or closed.

Furthermore, the construction described avoids the necessity for a tight metal-to-metal seat for the valve and the consequent accurate and expensive machining operation, and makes it possible for a complete seal-off to be made even with very gritty fluid because the grit will simply embed itself into the soft sealing members and will not prevent the forming of a seal, yet will not harm those portions which form the seal.

All of the objects and advantages set forth in connection with this invention have therefore been attained.

The invention having thus been described, what is claimed is:

1. In a valve structure, a housing having a flow passage therethrough and a chamber for a valve closure member intersecting said passage, a valve closure member in said chamber and a sealing ring of relatively soft yieldable material surrounding said passage and carried by said housing on each side of said chamber, said rings each having flexible fluid pressure actuated lips remote from and extending away from said passage, said lips having surfaces in communication with the interior of the body so that they are adapted when on the downstream side of the closure member to be forced by the upstream pressure into sealing engagement with said closure member.

2. In a valve structure, a housing having a flow passage therethrough and a chamber for a valve closure member intersecting said passage, a valve closure member in said chamber and a sealing ring of relatively soft yieldable material surrounding said passage and carried by said housing on each side of said chamber, said rings each having spaced apart fluid pressure actuated lips remote from and extending away from said passage, said lips having pressure surfaces in communication with the valve body adapted when on the downstream side of the closure member to be forced by the upstream pressure into sealing engagement with said closure member and said body respectively.

3. The structure of claim 2 wherein said ring and one of its said lips being formed to naturally lie closely adjacent to said closure member when the valve is closed without pressing thereagainst in the absence of such fluid pressure.

4. In a valve having a body with a passage therethrough and a movable valve member to control the passage, a rigid part carried by the body, downstream of the valve member, with an opening therethrough providing a portion of the body passage, said part having an edge conforming with a confronting surface of the valve member when in closed position, said valve member mounted so as to have its said confronting surface move relative to said edge of the part when the valve member is shifted to open and close the valve, said part mounted to provide a channel between it and the body, said channel opening into the interior of the body, a resilient lip type seal element within the channel having one lip extending away from said body passage and along the confronting surface of said valve member outwardly of said rigid part when the valve member is in closed position and having its surface laterally remote from said confronting surface in communication with the interior of the body to thereby be adapted to be engaged by the valve member when in closed position to seal between the valve member and the part.

5. The assembly of claim 4 wherein the rigid part is removably mounted in the body and the seal element has another lip extending outwardly from said part and along a portion of said body, said lip having a laterally disposed surface from said body in communication with the interior of the body to provide a seal between the body and the part.

HERBERT ALLEN.

REFERENCES CITED

The following references are of record in the file of this patent:

UNITED STATES PATENTS

| Number | Name | Date |
| --- | --- | --- |
| 1,489,857 | Stevens | Apr. 8, 1924 |
| 2,181,232 | Heinen | Feb. 20, 1940 |
| 2,433,732 | Brown | Dec. 30, 1947 |

FOREIGN PATENTS

| Number | Country | Date |
| --- | --- | --- |
| 174,750 | Switzerland | of 1935 |
| 268,833 | Italy | of 1934 |
| 520,188 | Germany | of 1931 |